(12) United States Patent
Weber

(10) Patent No.: US 11,695,833 B2
(45) Date of Patent: Jul. 4, 2023

(54) METHOD FOR DATA COMMUNICATION BETWEEN SUBSCRIBERS IN AN AUTOMATION NETWORK, MASTER SUBSCRIBER FOR AN AUTOMATION NETWORK, AND AUTOMATION NETWORK

(71) Applicant: Beckhoff Automation GmbH, Verl (DE)

(72) Inventor: Karl Weber, Altdorf (DE)

(73) Assignee: Beckhoff Automation GmbH, Verl (DE)

( * ) Notice: Subject to any disclaimer, the term of this patent is extended or adjusted under 35 U.S.C. 154(b) by 0 days.

(21) Appl. No.: 17/733,872

(22) Filed: Apr. 29, 2022

(65) Prior Publication Data
US 2022/0263901 A1    Aug. 18, 2022

Related U.S. Application Data

(63) Continuation-in-part of application No. PCT/EP2020/083231, filed on Nov. 24, 2020.

(30) Foreign Application Priority Data

Nov. 29, 2019   (DE) ...................... 10 2019 132 452.1

(51) Int. Cl.
*H04L 67/12*      (2022.01)
*G05B 19/05*      (2006.01)

(52) U.S. Cl.
CPC ............ *H04L 67/12* (2013.01); *G05B 19/056* (2013.01); *G05B 2219/1134* (2013.01); *G05B 2219/1214* (2013.01); *G05B 2219/15018* (2013.01)

(58) Field of Classification Search
CPC .................. H04L 67/12; G05B 19/056; G05B 2219/1134; G05B 2219/1214
See application file for complete search history.

(56) References Cited

U.S. PATENT DOCUMENTS 9,609,543 B1 *  3/2017  Vivanco ............ H04W 72/0446
10,873,536 B2  12/2020  Bunte et al.
(Continued)

FOREIGN PATENT DOCUMENTS

CN        106576064 A      4/2017
DE     102014112082 A1     2/2016
(Continued)

OTHER PUBLICATIONS

"IBM ILOG CPLEX Optimization Studio" Wikpedia, accessed May 10, 2022, 3 pages.
(Continued)

*Primary Examiner* — Normin Abedin
(74) *Attorney, Agent, or Firm* — Dorsey & Whitney LLP

(57) ABSTRACT

A method for real-time data communication between subscribers in an automation network is provided. The automation network includes an active subscriber, a plurality of passive subscribers and at least a connecting unit. The method includes the active subscriber arranging n data packets to be transmitted in a transmission order with a total occupancy time duration of the transmission order, performing an optimizing procedure for determining an optimized transmission order with minimum total occupancy time, and transmitting the n data packets in the optimized transmission order to the passive subscribers. An active subscriber for carrying out the method and an automation network comprising an active subscriber are also provided.

9 Claims, 3 Drawing Sheets

(56) References Cited

U.S. PATENT DOCUMENTS

| | | | |
|---|---|---|---|
| 2007/0195789 A1* | 8/2007 | Yao | H04L 47/564 370/395.21 |
| 2007/0242614 A1* | 10/2007 | Buettner | H04L 1/0061 370/248 |
| 2011/0153889 A1 | 6/2011 | Barrenscheen | |
| 2018/0288785 A1 | 10/2018 | Guo et al. | |
| 2019/0363906 A1 | 11/2019 | Bunte et al. | |
| 2020/0396161 A1* | 12/2020 | Jerolm | H04L 45/74 |

FOREIGN PATENT DOCUMENTS

| | | |
|---|---|---|
| DE | 102018001574 A1 | 8/2019 |
| WO | 2013130778 A1 | 9/2013 |

OTHER PUBLICATIONS

Dopatka et al. "A Top-Down Approach for Realtime Industrial-Ethernet Networks using Edge-Coloring of Conflict-Multigraphs," Speedam 2006, 8 pages., Jan. 1, 2006.

Zeng, Haibo et al. "Schedule Optimization of Time-Triggered Systems Communicating Over the FlexRay Static Segment," IEEE Transactions on Industrial Informatics, vol. 7, No. 1, Feb. 2011., Feb. 1, 2011.

International Preliminary Report on Patentability dated Feb. 25, 2022 in connection with PCT/EP2020/083231, 31 pages including English translation., Feb. 25, 2022.

International Search Report and Written Opinion dated Feb. 26, 2021 in connection with PCT/EP2020/083231, 18 pages including English translation., Feb. 26, 2021.

Graeser, Olaf et al. "Planning of Time Triggered Communication Schedules," Software-intensive verteilte Echtzeitsysteme, May 2009, pp. 21-30., May 1, 2009.

Wisniewski, Lukasz et al. "Seamless reconfiguration of Time Triggered Ethernet based protocols," IEEE, May 2015, 4 pages., May 1, 2015.

Hanzálek, Zdenek, et al. "Profinet IO IRT Message Scheduling With Temporal Constraints," IEEE, vol. 6, No. 3, Aug. 2010, 12 pages., Aug. 1, 2010.

Office Action dated Aug. 11, 2020 in connection with German patent application No. 102019132452.1, 8 pages including English translation., dated Aug. 11, 2020.

Balogh, et al. "Scheduling of Embedded Time-Triggered Systems," ACM, Sep. 4, 2007., Sep. 4, 2007.

Steiner, Wilfried, "An evaluation of SMT-based schedule synthesis for time-triggered multi-hop networks," 2010 31st IEEE Real-Time Systems Symposium, 10 pages., Nov. 1, 2010.

Wisniewski , et al., Wisniewski, Lukasz et al. "Scheduling of PROFINET IRT Communication in Redundant Network Topologies," IEEE, May 3, 2016., May 3, 2016.

Wisniewski , et al., Wisniewski, Lukasz et al. "Increasing Flexibility of Time Triggered Ethernet based Systems by Optimal Greedy Scheduling Approach," IEEE, Sep. 8, 2015., Sep. 8, 2015.

"EtherCAT—the Ethernet Fieldbus," EtherCAT Technology Group, Nov. 2012, 21 pages.

Office Action dated Dec. 28, 2022 in connection with Chinese patent application No. 202080081015.9, 7 pages including English translation.

* cited by examiner

METHOD FOR DATA COMMUNICATION BETWEEN SUBSCRIBERS IN AN AUTOMATION NETWORK, MASTER SUBSCRIBER FOR AN AUTOMATION NETWORK, AND AUTOMATION NETWORK

CROSS-REFERENCE TO RELATED APPLICATIONS

This is a continuation of International Patent Application No. PCT/EP2020/083231, filed 24 Nov. 2020, entitled METHOD FOR DATA COMMUNICATION BETWEEN SUBSCRIBERS IN AN AUTOMATION NETWORK, MASTER SUBSCRIBER FOR AN AUTOMATION NETWORK, AND AUTOMATION NETWORK, which claims priority to German patent application DE 10 2019 132 452.1, filed 29 Nov. 2019, entitled VERFAHREN ZUR DATENKOMMUNIKATION ZWISCHEN TEILNEHMERN IN EINEM AUTOMATISIERUNGSNETZWERK, MASTERTEILNEHMER FÜR EIN AUTOMATISIERUNGSNETZWERK UND AUTOMATISIERUNGSNETZWERK, each of which is incorporated by reference herein, in the entirety and for all purposes.

FIELD

A method for data communication between subscribers in an automation network, an active subscriber for an automation network, which is embodied to execute the method for data communication between subscribers of an automation network, and a corresponding automation network are provided.

BACKGROUND

Automation networks are frequently operated as what is referred to as "field-bus systems". Field-bus systems are industrial bus systems that enable real-time control of the machines or systems of the automation network. As a rule, the machines or systems of the automation network are controlled by programmable logic controllers (PLCs). The PLC uses the field-bus system to communicate with the field devices, e.g. sensors and actuators of the machines or systems of the automation network with the PLC. If several communication subscribers send data packets via the same data line, which may be embodied as a wired or wireless bus system, it must be defined which communication subscriber may send at which time. For this purpose, defined hierarchies and standardized data transmission protocols are provided.

In most cases, the field-bus systems operate in so-called "master-slave mode". This means that the active subscriber takes over the control of the processes, while the passive subscribers take over the processing of subtasks in the control mode of the automation network. Data are exchanged in the automation network with the aid of data packets that are output by the active subscriber to the passive subscribers. The passive subscribers can read the output data addressed to them and, as the case may be, send a data packet back to the active subscriber.

In automation networks in which data traffic takes place via the exchange of data packets the data packets may be forwarded from a passive subscriber to other passive subscribers or sent back to the active subscriber.

In this context, forwarding refers to the definition of transmission paths for transmitting data packets in the automation network. For networks with complex topologies in which passive subscribers are arranged in different segments of the network, data packets may be forwarded to the corresponding segments in which the addressed passive subscribers are arranged via corresponding connection elements. In this context, it may occur that data packets that are sent back to the active subscriber from different segments of the network collide on the way back from the passive subscribers to the active subscriber, i.e. arrive almost simultaneously at an intermediate connection element, causing additional delays of different data packets, which then negatively affects the response time of the system. However, not only overlaps on the data path are critical. Due to the sequence, it may also happen that individual data packets arrive so late at a device or segment and this device itself has a strong delay, so that a control action, which must take all data into account, is only accessed very late.

However, delays of individual data packets or the wrong sequence when transmitting in the master on the one hand cause an extension of the network occupancy time due to the delayed data packets, i.e. the time required by the data packets to be transmitted to the corresponding passive subscribers after being transmitted by the active subscriber and to be received again by the active subscriber, and during which the network is blocked by the data packets for the transmission of further data packets. The occupancy time of the network may in general also be referred to as the total occupancy time duration.

Furthermore, a delay of data packets to avoid overlapping of data packets may result in further delays of further data packets to again avoid collisions of the previously delayed data packets, wherein overlapping of data packets results in at least two data packets being transmitted in an at least partially overlapping manner in the same direction. Overlapping results in the information of the overlapped data packets not being uniquely readable, so that at least one of the overlapped data packets must be delayed to avoid overlapping. In addition to delays, changing the order of the transmitted data packets may also be used to avoid overlapping of the data packets. Both may lead to delays in the overall data communication between the active subscriber and the passive subscribers and thus to a reduction in the effectiveness and performance of the automation system.

In order to improve data communication in which a plurality of data packets are exchanged between an active subscriber and a plurality of passive subscribers, in particular to avoid or to reduce delays of individual data packets to avoid collisions, it may be advantageous to send out data packets in certain orders in which the data packets are arranged in such a way that collisions may either be avoided completely or the number of necessary delays or the total duration of the delays may be reduced.

The task of arranging data packets to be sent in advantageous sequences falls within the scope of scheduling problems. Scheduling problems in which optimal solutions are sought for sequences of several interdependent processes are characterized by a high degree of complexity and are usually not solvable in a practicable time and with realistic computational effort even for a relatively small number of factors to be considered.

In the field of data communication, various optimizing procedures are known from the prior art, the goal of which is to find sequences or schedules of data packets to be sent out with minimized network occupancy time by the data packets. For example, a scheduling method for PROFINET systems is disclosed in the document Wisniewski et al. "Scheduling of PROFINET IRT Communication in Redundant Network Topologies" (DOI: 10.1B/

WFCS.2016.7496530 Conference: 12th IEEE World Conference on Factory Communication Systems, At Aveiro, Portugal). However, the method described herein is still comparatively complex and requires substantial computational effort, which is ultimately not suitable for determining an optimum, but may only achieve an approximation of the desired optimum.

SUMMARY

The provided method is applicable to networks in which data streams run in parallel on partial links and overlaps may occur on other partial links. The aim is to reduce the effects of these overlaps to a minimum. The provided method therefore allows a coordination of data streams in an active-passive relationship of at least one active subscriber and at least one passive subscriber, wherein data streams of data packets sent out for data communication have common data paths so that a sequence of communication and sending out of the data packets are to be taken into account.

Thus an improved method for data communication between subscribers in an automation network is provided, which allows for a reduced occupancy time of the network by data packets to be exchanged for data communication and requires low computing capacity. Further an active subscriber for an automation network is provided, which is embodied to execute the method according to the invention for data communication between subscribers in an automation network. Further a corresponding automation network is provided.

EXAMPLES

A method for real-time data communication between subscribers in an automation network is provided, the automation network comprising an active subscriber, passive subscribers and at least one connecting unit interconnected via a data line network, wherein the active subscriber is embodied to send out data packets to the passive subscribers for data communication in a circulation in which the data packets are sent out by the active subscriber to the passive subscribers and are sent by the passive subscribers to the active subscriber, and wherein the connecting unit is embodied to forward data packets addressed to the passive subscribers and to forward the data packets back to the active subscriber, the method comprising the method steps:

the active subscriber arranging n data packets to be sent out in a transmission order having a total occupancy time duration of the transmission order in a first arranging step, the total occupancy time duration comprising a duration from the active subscriber transmitting a first bit of a first transmitted data packet to the active subscriber receiving a last bit of a last received data packet, the active subscriber performing an optimizing procedure for determining an optimized transmission order having a minimum total occupancy time duration in an optimizing step, the optimizing procedure comprising a finite number of at most $n*(n-1)/2$ pairwise permutations of orders of n data packets consecutive in the transmission order and determining the total occupancy time durations of the transmission order caused by the permutations, and the active subscriber sending out the n data packets in the optimized transmission order to the passive subscribers in a transmitting step.

This achieves the technical advantage of providing a method for real-time capable data communication between subscribers in an automation network that enables effective and powerful data communication with a reduced occupancy time of the communication medium by the data packets exchanged for data communication. By performing the optimizing procedure in the optimizing step, a transmission order for the data communication of data packets to be transmitted may be achieved that comprises a minimum total occupancy time of the communication medium by the data packets to be transmitted. Using a finite number of a maximum of $n*(n-1)/2$ pairwise permutating steps of orders of the data packets arranged in the transmission orders, a transmission order with a minimum occupancy time may be determined. In total, for a transmission order of n data packets, n! (n factorial) permutations of the data packets are possible.

The finite number of a maximum of $n*(n-1)/2$ pairwise permutations of the sequences of the data packets arranged in the transmission orders may be performed with a comparatively low computing effort. This achieves the technical advantage that only a comparatively small computing capacity is required to achieve a transmission order with minimum occupancy time. This achieves the technical advantage that the provided method for real-time capable data communication between subscribers in an automation network may be carried out by an active subscriber of the automation network. On the other hand, an additional computing unit for executing the optimizing procedure is not required.

By achieving a transmission order with minimum total occupancy time in a maximum of $n*(n-1)/2$ pairwise permutating steps of sequences of data packets following each other in the transmission order, fast optimizing of the transmission order with respect to the total occupancy time may be achieved. A costly and time-consuming optimizing procedure for determining an optimized transmission order with minimum total occupancy time duration may be dispensed with. Thus, the method according for real-time capable data communication between subscribers in an automation network may easily be performed by the active subscriber before each transmission of a plurality of data packets. A delay of the data communication due to an upstream execution of a time-intensive optimizing procedure may thus be avoided.

In the optimizing step, a transmission order having a minimum total occupancy time duration of the data packets arranged in the transmission order is determined by performing the optimizing procedure. By performing the maximum of $n*(n-1)/2$ pairwise permutations of the orders of the data packets arranged in the transmission order, the transmission order for which the data packets transmitted in this transmission order are subject to the least delay to avoid collisions between data packets is determined. A minimum total occupancy time of a transmission order is achieved if the data packets to be transmitted in the transmission order are arranged in such a way that, after transmitting the data packets in the corresponding transmission order, either no collisions occur between the transmitted data packets or, in the case that collisions cannot be avoided due to the respective topology of the automation network, these lead to a minimum delay of the transmitted data packets.

BRIEF DESCRIPTION OF THE DRAWINGS

The invention is described in more detail with reference to the accompanying figures, which show.

DETAILED DESCRIPTION

Figure 1:
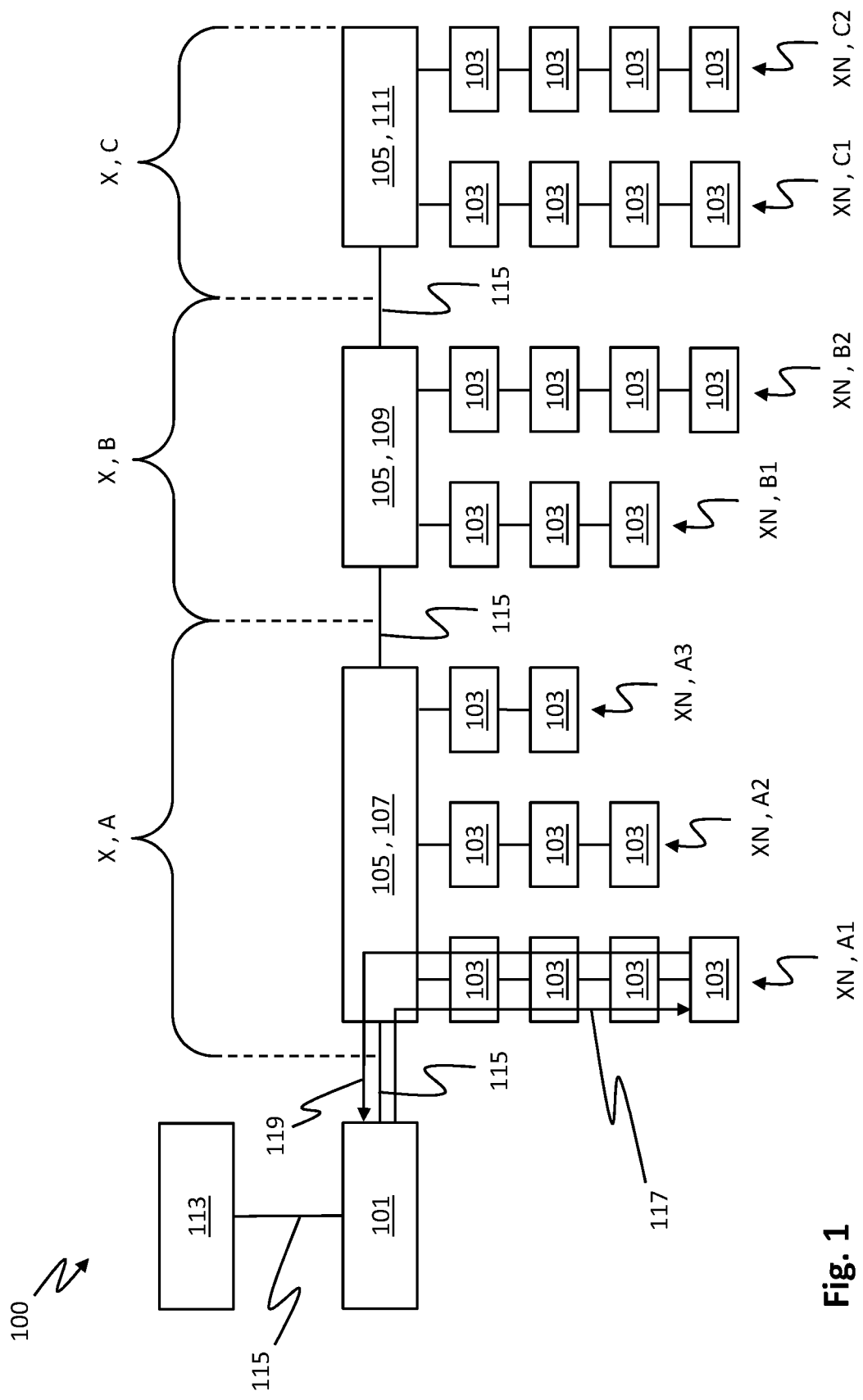
FIG. 1 is a schematic depiction of an automation network according to an example.

In the following, an automation network is an automation system in which an active subscriber, a plurality of passive subscribers, and at least one connecting unit are arranged in a particular topology or structure via a data line network. The topology or structure may e.g. be a tree structure, a comb structure, a ring structure, a linear structure, or a structure of some other type. The subscribers of the automation network are arranged in a master-slave communication structure in which the active subscriber is exclusively arranged to send out communication requests to the passive subscribers.

In the following, an active subscriber is a member of an automation network that is exclusively authorized to initiate data communication with corresponding passive subscribers. An active subscriber may e.g. be a field-bus master.

In the following, a passive subscriber is a subscriber or member in an automation network that is not authorized to initiate data communication with other subscribers in the automation network. A passive subscriber is exclusively authorized to participate in a data communication initiated by an active subscriber. A passive subscriber may e.g. be a field-bus terminal, an actuator or a sensor of the automation network.

In the following, a data line network may e.g. be a field-bus system.

In the following, data packets may e.g. be telegrams of a corresponding communication protocol and comprise at least a header and a data section. For example, data packets may be telegrams of an Ethernet protocol, an EtherCAT protocol or a further field-bus protocol.

In the following, a connecting unit is a unit that is embodied to forward data packets used for data communication to correspondingly addressed subscribers of the automation network. A functionality of a connecting unit may also be integrated in a passive subscriber or in a plurality of passive subscribers and/or in an active subscriber or in a plurality of active subscribers.

Moreover, the method may be used to achieve an optimum of the total occupancy time for decoupled subscribers.

According to an example, the passive subscribers may be divided up into segments, wherein each segment comprises at least a passive subscriber, and wherein the connecting unit is configured to forward data packets addressed to passive subscribers of a particular segment.

In the following, a segment is a section of an automation network. A segment may in turn be divided up into subsegments. A segment may comprise at least a passive subscriber or a plurality of passive subscribers of the automation network. A segment may be connected to other segments of the automation network via a corresponding connecting unit.

In the following, pairwise permutations are the permutations of the order of two data packets directly following each other in the transmission order.

According to an example, the first arranging step comprises:

arranging the n data packets in a descending transmission order with descending individual circulation durations of the n data packets in a second arranging step, wherein in the descending transmission order a data packet with the longest individual circulation duration is arranged at the first position and a data packet with the shortest individual circulation duration is arranged at the last position of the transmission order, and wherein the individual circulation time duration of each data packet comprises a period from transmission by the active subscriber of a first bit of the data packet to receipt by the active subscriber of a last bit of the data packet.

This has the technical advantage of providing an efficient method for real-time data communication between subscribers in an automation network.

The pre-arrangement of the n data packets performed in the first arranging step allows for reducing the number of required pairwise permutations of the data packets in the optimizing step to achieve the optimized transmission arrangement with minimum total occupancy time duration. By arranging the data packets in the descending transmission order in the second arranging step, in which the data packet with the longest individual circulation time duration is arranged in the first position and the data packet with the shortest individual circulation time duration is arranged in the last position, it is possible to achieve that the total occupancy time duration of the descending transmission order is already reduced compared to a transmission order with arbitrarily arranged data packets, in that the data packet which requires the longest time for the circulation from the transmitting active subscriber to the addressed passive subscriber and back again to the active subscriber is transmitted as the first data packet.

If no collisions of the transmitted data packets occur for the respective topology of the automation network in the descending transmission order, the descending transmission order already represents the optimized transmission order with minimum total occupancy time. The time required to determine the optimized transmission order with minimum total occupancy time may already be substantially reduced by arranging the data packets in the descending transmission order in the second arranging step compared to any transmission order.

According to an example, the first arranging step comprises:

determining a first receipt time marker for each of the n data packets of the descending transmission order in a first determining step, wherein the first receipt time marker of any data packet of a transmission order is a time of receipt of the first bit of the respective data packet, and wherein a value of the first receipt time marker comprises a period from the active subscriber transmitting the first bit of the first data packet of the transmission order to the active subscriber receiving the first bit of the respective data packet of the transmission order, and determining a second receipt time marker for each of the n data packets of the descending transmission order, wherein the second receipt time marker corresponds to a sum of the value of the first receipt time marker and an individual occupancy time duration of the data packet, the individual occupancy time duration of a data packet comprising a period of time from the transmission of a first bit of the data packet to a first transmission time marker to the transmission of a last bit of the data packet to a second transmission time marker, wherein the first transmission time marker is a time of transmission of the first bit of the respective data packet, and wherein the second transmission time marker is a time of transmission of the last bit of the data packet;

arranging the n data packets of the descending transmission order in an ascending transmission order with an ascending first receipt time marker of the n data packets in a third arranging step, wherein in the ascending transmission order a data packet with a smallest first receipt time marker is arranged at first position and a data packet with largest first receipt time marker is arranged at last position; and determining a corrected first receipt time marker and a corrected second receipt time marker for a data packet in the ascending transmission order in a correcting step if the first receipt time marker of the data packet is earlier than the second receipt time marker of a data packet placed before the data packet in the ascending transmission order, wherein the corrected first receipt time marker of the data packet corresponds to the second receipt time marker of the data packet arranged before the data packet, and wherein the corrected second receipt time marker of the data packet corresponds to a sum of the corrected first receipt time marker and the individual occupancy time duration of the data packet.

This achieves the technical advantage that an efficient method for real-time capable data communication between subscribers in an automation network may be provided. By arranging the n data packets in a transmission order in the arranging step, it may be achieved that an optimized transmission order with minimum total occupancy time in the optimizing step may be achieved in a reduced number of the maximum of $n*(n-1)/2$ pairwise permutations.

By arranging the data packets from the descending transmission order in the ascending transmission order in the third arranging step and by performing the corrections in the correcting step, a receipt order of the transmitted data packets including delays of data packets to be performed to avoid collisions between successive data packets may be simulated. This allows for simplified determining of the transmission order with minimum total occupancy time in the following optimizing step.

A first receipt time marker of a data packet is smaller or larger than a first receipt time marker of a further data packet, respectively, if a value of the first receipt time marker of the data packet is smaller or larger than a value of the first receipt time marker of the further data packet, respectively.

The first transmission time marker and the second transmission time marker are calculated relative to the first transmission time marker of the first transmitted data packet. The first transmission time marker of the first transmitted data packet is therefore assigned the value 0. A value of a first transmission time marker of a data packet of the transmission order thus covers a period from transmission by the active subscriber of a first bit of a first transmitted data packet to transmission by the active subscriber of a first bit of the respective data packet.

In the following, a sum of durations and/or time markers is a sum of values of durations and/or values of time markers.

Alternatively, the first receipt time marker of any data packet may comprise a period from the transmission of the first bit of the first data packet of the transmission order to the receipt of any bit of the respective data packet of the transmission order for which a forwarding decision is to be made in its stead. This may also be the last bit of the data packet.

According to an example, a corrected total occupancy time period of the ascending transmission order comprises a period from the first transmission time marker of the first data packet of the ascending transmission order to the corrected second receipt time marker of the last data packet of the ascending transmission order.

This achieves the technical advantage of a corrected total duration of occupancy that is easy to determine. The corrected total duration of occupancy is the total duration of occupancy of the ascending transmission order.

According to an example, the arranging step comprises the method steps:

determining a transmission offset for each data packet in a second determining step, wherein the transmission offset of a data packet corresponds to a sum of the individual occupancy durations of the data packets preceding the data packet in the transmission order, and arranging the n data packets in the descending transmission order in a fourth arranging step in such a way that a transmission of a first bit of a data packet is delayed by the transmission offset of the data packet with respect to the transmission of a first bit of the first data packet of the descending transmission order.

The technical advantage of this is that by determining the transmission offset and arranging the data packets in the descending transmission order, transmission of a data packet in the descending transmission order to transmission of the first data packet in the descending transmission order is delayed by the transmission offset of the respective data packet. In this way, a direct succession of the transmission of the individual data packets of the descending transmission order may be achieved. It may thus be avoided that a gap occurs between the transmission of successive data packets, which may lead to an extension of the total occupancy time of the descending transmission order.

Thus, by determining the transmission offset and arranging the data packets in the descending transmission order in the fourth arranging step, the total occupancy time duration of the descending transmission order may thus be further reduced and, consequently, the number of necessary permutations of the order of successive data packets in the descending transmission order required in the optimizing step to determine an optimized transmission order with minimum total occupancy time duration may be reduced.

According to an example, the first receipt time marker of a data packet corresponds to a sum of the transmission offset and the individual circulation time duration of the data packet minus the individual occupancy time duration of the data packet.

This achieves the technical advantage of a first receipt time marker that is easy to determine. This in turn allows for a simplified optimizing procedure and reduces the computational effort required to perform the optimizing procedure.

According to an example, the optimizing step comprises:

permutating the order of an i-th data packet and an (i+1)-th data packet following the i-th data packet in an m-th transmission order of the n data packets with an m-th total occupancy time duration of the m-th transmission order, forming an (m+1)-th transmission order with an (m+1)-th total occupancy time duration, wherein in the (m+1)-th transmission order, the order of the i-th data packet and the (i+1)-th data packet is permutated, and wherein 1≤i≤n−1 and n≥3, in a first permutating step, and verifying that the (m+1)-th total occupancy time duration is shorter than the m-th total occupancy time duration in a first verifying step.

If the (m+1)-th total occupancy period is not shorter than the m-th total occupancy period:

re-permutating the order of the i-th data packet and the (i+1)-th data packet and restore the m-th transmission order in a first re-permutating step;

verifying that i=n−1 applies in the m-th transmission order in a second verifying step;

If i=n−1 applies, sending out the n data packets based on the m-th sending order in the transmitting step;

if i=n−1 does not apply, setting i=i+1 in the m-th transmission order in a first setting step; and continuing with the first permutating step with the m-th transmission order.

If the (m+1)-th total occupancy time duration is shorter than the m-th total occupancy time duration, maintaining the permutation of the order of the i-th data packet and the (i+1)-th data packet in the (m+1)-th transmission order and setting k=i in the (m+1)-th transmission order in a second setting step, and verifying that k<2 in the (m+1)-th order of transmission in a third verifying step;

if k<2 applies, continuing with the second verifying step with the (m+1)-th transmission order, if k<2 does not apply:

permutating the order of the k-th data packet and the (k−1)-th data packet preceding the k-th data packet in the (m+1)-th transmission order, and determining an (m+2)-th transmission order with an (m+2)-th total occupancy time duration, wherein in the (m+2)-th transmission order the order of the k-th data packet and the (k−1)-th data packet is permutated in a second permutating step, and verifying if the (m+2)-th total occupancy time duration is shorter than the (m+1)-th total occupancy time duration in a fourth verifying step.

If the (m+2)-th total occupancy time duration is not shorter than the (m+1)-th total occupancy time duration:

re-permutating the order of the k-th data packet and the (k−1)-th data packet and restoring the (m+1)-th transmission order in a second re-permutating step, and continuing with the second verifying step with the (m+1)-th transmission order.

If the (m+2)-th total occupancy time duration is shorter than the (m+1)-th total occupancy time duration:

maintaining the permutation of the order of the k-th data packet and the (k−1)-th data packet in the (m+2)-th transmission order and setting k=k−1 and m=m+2 in a third setting step, and continuing the third verifying step with the m-th transmission order.

This achieves the technical advantage that an efficient method for real-time data communication between subscribers in an automation network may be provided. By performing a maximum of n*(n−1)/2 pairwise permutations of successive data packets in the optimizing step, an optimizing procedure may be provided that is comparatively easy to perform and requires only a small amount of computation.

In the optimizing procedure, pairwise permutations of the sequences of successive data packets are first performed starting from the beginning of the transmission order. After each pairwise permutating of the sequence of successive data packets, the total occupancy time duration of the transmission order generated by the permutation is determined and it is verified whether the total occupancy time duration of the transmission order created by the pairwise permutating of the sequence of successive data packets is shorter than the total occupancy time duration of the initial transmission order. If the pairwise permutating of the sequence of successive data packets does not result in an improvement of the total occupancy time duration, further pairwise permutating of successive data packets is continued until the end of the transmission order is reached. If the pairwise permutations do not result in an improvement of the total occupancy time, the optimizing procedure is aborted and the initial transmission order is used for transmitting the data packets.

In the following, the initial transmission order is the transmission order in which the first pairwise permutation is carried out.

If a pairwise permutation of the sequence of successive data packets results in a transmission order with a total occupancy time duration which is shorter than the total occupancy time duration of the initial transmission order, the permutation of the order of successive data packets is maintained and further permutations of successive data packets are continued starting from the respectively permutated data packets in the direction of the start of the transmission order. This results in an alternating pairwise permutation of orders of successive data packets, which is continued in the direction of the end of the transmission order and in the direction of the beginning of the transmission order, respectively, until a transmission order is reached, the total occupancy time duration of which is shorter than the total occupancy time durations of all transmission orders previously generated by pairwise permutation, including the initial transmission order.

Due to the alternate continuation of the pairwise permutations both in the direction of the end of the transmission order and in the direction of the beginning of the transmission order and in that the pairwise swap is only continued if the total occupancy time duration of the transmission order generated by the last pairwise permutation is shorter than the total occupancy time durations achieved so far up to this permutating step, a transmission order with minimum total occupancy time duration is achieved after a finite number of at most n*(n−1)/2 pairwise permutations. This achieves a time- and computationally efficient optimizing procedure that obtains an optimized transmission order with minimum total occupancy time duration after a finite time interval.

According to an example, the first permutating step starts with the first data packet with i=1 of the first transmission order with m=1.

This has the technical advantage that the optimizing process starts with a permutation of the first and second data packets of a transmission order, in particular the initial transmission order. This ensures that all data packets of the transmission order are swapped at least once with a directly adjacent data packet. This ensures that a transmission order with minimum total occupancy time is achieved.

According to an example, the first total occupancy time duration with m=1 is the corrected total occupancy time duration of the ascending transmission order.

This achieves the technical advantage of providing an efficient method for real-time data communication between subscribers in an automation network. By using the ascending transmission order as the initial transmission order to perform the optimizing procedure, the number of required pairwise permutations to determine the optimized transmission order with minimum total occupancy time may be reduced.

This may lead to an acceleration of the optimization process, which in turn increases the efficiency of the process for data communication between subscribers in an automation network, in which data packets may be sent out in shorter successive periods.

An active subscriber for an automation network is provided, wherein the active subscriber is embodied to perform a method according to the invention for real-time data communication between subscribers of an automation network.

This achieves the technical advantage that an active subscriber may be provided for an automation network, which is embodied to execute the method according to the invention for real-time capable data communication between subscribers in an automation network.

Further, an automation network is provided having at least an active subscriber, a plurality of passive subscribers and at least one connecting unit, which are connected to one another via a data line network, wherein the active subscriber is configured to send out data packets to the passive subscribers for data communication in circulation, in which the data packets are sent out by the active subscriber to the passive subscribers and are returned by the passive subscribers to the active subscriber, and wherein the connecting unit is embodied to forward data packets addressed to the passive subscribers of a specific segment and to forward the data packets back to the active subscriber.

This achieves the technical advantage that an automation network may be provided that is embodied to execute the method for real-time capable data communication between subscribers in an automation network. This provides an automation network that allows for efficient data communication. Efficient data communication may increase the efficiency and performance of the automation network.

According to an example, the automation network is divided up into segments, each segment comprising at least a passive subscriber.

FIG. 1 shows a schematic diagram of an automation network 100 according to an example.

According to the example of FIG. 1 the automation network 100 comprises at least an active subscriber 101, a plurality of passive subscribers 103 and at least a connecting unit 105, which are connected 115 via a data line network, the automation network 100 being divided up into segments X, each segment X comprising at least one passive subscriber 103, the active subscriber 101 being embodied to transmit data packets to the passive subscribers 103 for data communication in a circulation, in which the data packets are sent out by the active subscriber 101 to the passive subscribers 103 and are returned by the passive subscribers 103 to the active subscriber 101, and the connecting unit 105 being embodied to forward data packets addressed to the passive subscribers 103 of a specific segment X and to forward the data packets back to the active subscriber 101.

According to the example of FIG. 1, the automation network 100 comprises a controller 113 that is connected to the active subscriber 101 and the passive subscribers 103 via a data line network 115. The automation network 100 is divided up into a first segment A, a second segment B, and a third segment C, each of which is linearly connected to the active subscriber 101 via the data line network 115. The first segment A further comprises a first sub-segment A1, a second sub-segment A2, and a third sub-segment A3. The second segment B comprises a fourth sub-segment B1 and a fifth sub-segment B2. The third segment C comprises a sixth subsegment C1 and a seventh subsegment C2.

The automation network 100 is thus arranged in a comb structure in that the segments X are arranged linearly with respect to one another and the corresponding subsegments XN are each connected exclusively to the associated segment X. The individual sub-segments XN each comprise a plurality of passive subscribers 103, each of which are interconnected via the data line network 115. The individual sub-segments XN may comprise a different number of different passive subscribers 103. Alternatively, the sub-segments XN may comprise an equal number of passive subscribers 103.

As an alternative to the structure shown in FIG. 1, the automation network 100 may be implemented in a different structure. For example, the automation network 100 may comprise a different number of segments X and subsegments XN from that shown in FIG. 1. Furthermore, the automation network 100 may e.g. be arranged in a tree structure or a ring structure. In addition, the sub-segments XN may comprise any number of passive subscribers 103.

Furthermore, the automation network 100 comprises a plurality of connecting units 105, which are embodied to forward data packets sent from the active subscriber 101 to specific passive subscribers 103 to the respective addressed passive subscribers 103, or to forward data packets sent from the passive subscribers 103 to the active subscriber 101. According to FIG. 1, the first segment A comprises a first connecting unit 107 that is configured to forward data packets from the active subscriber 101 to the passive subscribers 103 arranged in the first subsegment A1, the second subsegment A2 or the third subsegment A3. The second segment B comprises a second connecting unit 109 configured to forward data packets from the active subscriber 101 to the passive subscribers 103 arranged in the fourth sub-segment B1 or the fifth sub-segment B2. The third segment C comprises a third connecting unit 111, which is configured to forward data packets transmitted from the active subscriber 101 to the passive subscribers 103 arranged in the sixth subsegment C1 or the seventh subsegment C2 to the corresponding passive subscribers 103. The connecting units 105 are correspondingly configured to forward data packets addressed to the active subscriber 101 by the respective passive subscribers 103 to the active subscriber 101.

Thus, a data packet transmitted from the active subscriber 101 to a passive subscriber 103 in the first sub-segment A1 of the first segment A is forwarded by the first connecting unit 107 into the first sub-segment A1 and to the corresponding passive subscriber 103 arranged therein. The corresponding data packet thus passes through a section of the data line network 115 within the first segment A in a data communication device 117 and is forwarded into the first subsegment A1 by the first connecting unit 107. Within the first sub-segment A1, the data packet passes through the passive subscribers 103 arranged therein, and the corresponding data of the data packet are read out by the addressed passive subscriber 103.

Alternatively, a plurality of passive subscribers may be addressed within a segment. Alternatively, the segment as a whole and thus all passive subscribers of the segment may be addressed.

Arriving at the last passive subscriber 103 of the first subsegment A1, the data packet is returned to the active subscriber 101 by the last passive subscriber 103, and the data packet passes through the first subsegment A1 in a data communication return direction 119 and is returned to the active subscriber 101 by the first connecting unit 107. The data communication forward direction 117 and the data communication return direction 119 are shown in FIG. 1 by the two arrows pointing away from and toward the active subscriber 101.

Similarly, a data packet sent from the active subscriber 101 to e.g. a passive subscriber 103 of the sixth subsegment C1 or the seventh subsegment C2 of the third segment C passes through the first segment A, the second segment B and the third segment C in a data communication direction of the sections of the data line network 115 and is forwarded to the sixth subsegment C1 or the seventh subsegment C2 by the third connecting unit 111. The corresponding data packet passes through the entire sub-segment XN and is returned to the active subscriber 101 by the last respective passive subscriber 103 of the corresponding sub-segment XN in a data communication reverse direction, wherein the third connecting unit 111 forwards the returned data packet to the active subscriber 101.

The returned data packet also passes through the sections of the data line network 115 of the third segment C, the second segment B, and the first segment A in the data communication return direction and is received by the active subscriber 101. There are data communication forward directions and the data communication return directions for passive subscriber 103 in the second sub-segment A2, the third sub-segment A3, the fourth sub-segment B1, the fifth sub-segment B2, the sixth sub-segment C1, or the seventh sub-segment C2. Corresponding data communication forward directions and data communication return directions run analogously to the data communication forward direction 117 and data communication return direction 119 shown in FIG. 1 for passive subscriber 103 of the first subsegment A1.

The active subscriber 101 is embodied to execute a method for real-time capable data communication between subscribers in an automation network 100. For a detailed description of the method for real-time capable data communication between subscribers in an automation network 100, reference is made to the figure description for FIGS. 2 to 5.

The data line network 115 may e.g. be a field-bus system, in particular an Ethernet or an EtherCAT or a Profibus system. The active subscriber 101 may e.g. be a field-bus master. A passive subscriber 103 may e.g. be a field-bus device, in particular a field-bus terminal, an actuator or a sensor. A connecting unit 105 may be embodied to forward data packets sent out by the active subscriber to corresponding passive subscribers 103 to the corresponding passive subscribers 103, or to forward data packets returned to the active subscriber 101 by the passive subscribers 103 to the active subscriber 101. A connecting unit 105 may e.g. be embodied as a switch.

The connecting units 105 may further be configured to delay data packets so as to prevent collision of successive data packets. In particular, data packets located on the data communication return direction may thus be delayed in forwarding to the active subscriber 101 by various connecting units 105 of the individual segments X until a preceding data packet has been completely forwarded to the active subscriber 101 by the corresponding connecting unit 105. After a preceding data packet has been completely forwarded by the corresponding connecting unit 105, a subsequent data packet may be completely forwarded to the active subscriber 101 by the corresponding connecting unit 105. Thus, collisions between different data packets may be prevented.

In particular, the connecting units 105 may be configured to forward the data packets sent out by the active subscriber 101 to the passive subscribers 103 or by the passive subscribers 103 to the active subscriber 101 to the corresponding passive subscribers 103 or to the active subscriber 101 in a cut-through method or in a store-and-forward method.

The automation system 100 in the example shown in FIG. 1 is merely exemplary in nature and serves illustrative purposes only. As an alternative to the example shown in FIG. 1, the automation system 100 may have a different example. In particular, the arrangement number of passive subscribers 103 may vary. Similarly, the automation system 100 may have a different number of segments X. In particular, the passive subscribers 103 in the automation system 100 may not be arranged in segments X.

Figure 2:
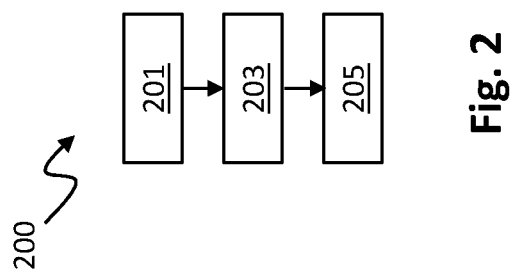
FIG. 2 is a flowchart of a method for data communication between subscribers in an automation network according to an example.

FIG. 2 shows a flowchart of a method 200 for data communication between subscribers in an automation network 100 according to an example.

The method 200 will be described below with reference to the automation network 100 described for FIG. 1. However, the method 200 is not limited to the automation network 100 with the structure shown in FIG. 1, but may also be applied to automation networks with differing structures.

According to the example in FIG. 2, the automation network 100 comprises at least an active subscriber 101, a plurality of passive subscribers 103 and at least a connecting unit 105 which are connected via a data line network 115, the automation network 100 being divided up into segments X, each segment X comprising at least one passive subscriber 103, the active subscriber 101 being embodied to transmit data packets to the passive subscribers 103 for data communication in a circulation, in which the data packets are sent out by the active subscriber 101 to the passive subscribers 103 and are returned by the passive subscribers 103 to the active subscriber 101, and the connecting unit 105 is embodied to forward data packets addressed to the passive subscribers 103 of a specific segment X and to return the data packets to the active subscriber 101.

According to the example, the method 200 comprises the method steps:

the active subscriber 101 arranging n data packets to be transmitted in a transmission order with a total occupancy time duration of the transmission order in a first arranging step 201, wherein the total occupancy time duration comprises a period from transmission, by the active subscriber 101, of a first bit of a first transmitted data packet to receipt, by the active subscriber 101, of a last bit of a last received data packet, the active subscriber 101, performing an optimizing procedure for determining an optimized transmission order with minimum total occupancy time duration in an optimizing step 203, the optimizing procedure comprising a finite number of at most $n*(n-1)/2$ pairwise permutations of orders of n data packets consecutive in the transmission order and determining the total occupancy time durations of the transmission order caused by the permutations; and the active subscriber 101 transmitting the n data packets in the optimized transmission order to the passive subscribers 103 in a transmitting step 205.

In a first arranging step 201, the active subscriber 101 arranges n data packets to be transmitted in a transmission order with a total occupancy time duration. The n data packets may be any number of data packets to be transmitted, wherein n may be any natural number. A transmission order may be any order of the n data packets to be transmitted in which data packets are arranged sequentially, such that the n data packets to be transmitted may be transmitted sequentially by the active subscriber 101 according to the transmission order.

The n data packets to be transmitted may be arranged in any order in the transmission order. As explained with respect to FIG. 1, a data communication between the active subscriber 101 and the passive subscribers 103 may be performed in a circulation method in which the data packets sent out by the active subscriber 101 to the corresponding passive subscribers 103 are returned to the active subscriber 101 after the data contained in the data packets are read out by the corresponding passive subscribers 103. Thus, the n data packets sent out by the active subscriber 101 are finally received back by the active subscriber 101 after passing through the corresponding passive subscribers 103.

Thus, a total occupancy time duration of a transmission order of the n data packets to be transmitted comprises a time period from transmission of a first bit of a first transmitted data packet to receipt of a last bit of a last received data packet by the active subscriber 101. Thus, a total occupancy time duration of the transmission order describes a time period during which the n transmitted data packets are transmitted between the active subscriber 101 and the passive subscribers 103 via the data line network 115.

In an optimizing step 203, the active subscriber 101 performs an optimizing procedure to determine an optimized transmission order with minimum total occupancy time. For this purpose, the active subscriber 101 performs a finite number of pairwise permutations of orders of n data packets succeeding each other in the transmission order.

Pairwise permutation of the order of successive data packets comprises permutating a data packet with a data packet directly preceding or directly following it in the transmission order, so that two data packets arranged directly behind each other in the transmission order each take the position of the data packet directly preceding or following it in the transmission order.

After each pairwise permutation of two consecutive data packets, the active subscriber 101 determines the total occupancy time of the transmission order with the respective pairwise-permutated data packets. After a maximum of $n*(n-1)/2$ pairwise permutations of the data packets in the transmission order by the active subscriber 101, the active subscriber 101 determines the optimized transmission order with minimum total occupancy time.

In a transmission step 205, the active subscriber 101 sends out the n data packets to be transmitted to the passive subscribers 103 according to the optimized transmission order.

If the pairwise permutations of the sequences of successive data packets in the transmission order do not result in an optimized transmission order with minimum total occupancy time, i.e.: if the pairwise permutations do not improve the total occupancy time compared to the original transmission order, the n data packets to be transmitted are transmitted according to the original transmission order.

Figure 3:
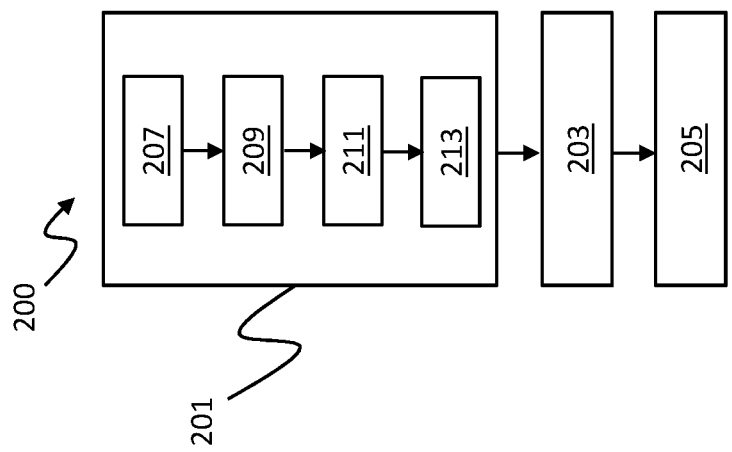
FIG. 3 is a flowchart of the method for data communication between subscribers in an automation network according to a further example.

FIG. 3 shows a flowchart of the method 200 for data communication between subscribers in an automation network 100 according to another example.

Unless otherwise indicated, the method 200 according to the example in FIG. 3 comprises the method steps described for FIG. 2.

According to the example shown in FIG. 3, the first arranging step 201 comprises the method steps:

arranging the n data packets in a descending transmission order having descending individual circulation durations of the n data packets in a second arranging step 207, wherein in the descending transmission order a data packet with the longest individual circulation duration is arranged at the first position and a data packet with the shortest individual circulation duration is arranged at the last position of the transmission order, and wherein the individual circulation time duration of each data packet comprises a period from transmission by the active subscriber 101 of a first bit of the data packet to receipt by the active subscriber 101 of a last bit of the data packet;

determining a first receipt time marker for each of the n data packets of the descending transmission order in a first determining step 209, wherein the first receipt time marker of any data packet of a transmission order is a point in time of a receipt of the first bit of the respective data packet, and wherein a value of the first receipt time marker comprises a time period from transmission by the active subscriber 101 of the first bit of the first data packet of the transmission order to receipt by the active subscriber 101 of the first bit of the respective data packet of the transmission order, and determining a second receipt time marker for each of the n data packets of the descending transmission order, wherein the second receipt time marker corresponds to a sum of the value of the first receipt time marker and to an individual occupancy time period of the data packet, wherein the individual occupancy time period of a data packet comprises a time period from transmission of a first bit of the data packet to a first transmission time marker to transmission of a last bit of the data packet to a second transmission time marker;

arranging the n data packets of the descending transmission order in an ascending transmission order with ascending first receipt time marker of the n data packets in a third arranging step 211, wherein in the ascending transmission order a data packet with smallest first receipt time marker is arranged at first position and a data packet with largest first receipt time marker is arranged at last position; and determining a corrected first receipt time marker and a corrected second receipt time marker for a data packet in the ascending transmission order in a correcting step 213 if the first receipt time marker of the data packet is earlier than the second receipt time marker of a data packet placed before the data packet in the ascending transmission order, wherein the corrected first receipt time marker of the data packet corresponds to the second receipt time marker of the data packet preceding the data packet, and wherein the corrected second receipt time marker of the data packet corresponds to a sum of the corrected first receipt time marker and the individual occupancy time duration of the data packet.

In a second arranging step 207, the active subscriber 101 arranges the n data packets of the transmission order in a descending transmission order with descending individual circulation time duration of the n data packets, wherein in the descending transmission order the data packet with the longest individual circulation time duration is arranged in the first position of the descending transmission order and the data packet with the shortest individual circulation time duration is arranged in the last position of the descending transmission order. Here, an individual circulation time duration of a data packet comprises a period from transmission by the active subscriber 101 of a first bit of the data packet to receipt by the active subscriber 101 of a last bit of the data packet. As mentioned above, a data communication between the active subscriber 101 and the passive subscribers 103 comprises a transmission of a data packet by the active subscriber 101 to corresponding passive subscribers 103 and a return of the data packet by the addressed passive subscribers 103 and a corresponding receipt of the returned data packet by the active subscriber 101.

For this purpose, the active subscriber 101 may determine a corresponding individual circulation time duration for each data packet. In this case, an individual circulation time duration results from a sum of twice the latency, an individual occupancy time duration of the data packet and an individual circulation time duration of the data packet for the corresponding segment. The latency of the data packet here comprises a period of time required for the data transmission of the data packet from the active subscriber 101 to the corresponding connecting unit 105 of the respective segment X in which the passive subscriber 103 to which the data packet to be transmitted is addressed is located.

An individual occupancy time period of the data packet comprises a time period from the transmission of a first bit of the data packet to a first transmission time marker to the transmission of a last bit of the data packet to a second transmission time marker by the active subscriber 101. An individual occupancy time period of the data packet in the corresponding segment comprises a time period from the receipt of the first bit of the data packet by the corresponding connecting unit 105 of the respective segment X to the transmission of the last bit of the data packet by the corresponding connecting unit 105 to the active subscriber 101.

The individual circulation time duration of the data packet in the corresponding segment thus describes the time required by the respective data packet to completely pass through the corresponding segment X or the associated sub-segment XN in which the addressed passive subscriber 103 is located, so that the respective data packet may be sent back to the active subscriber 101 by the corresponding connecting unit 105 after being read out by the addressed passive subscriber 103. For a data communication between the active subscriber 101 and the passive subscribers 103 for which the cut-through procedure is used, the individual occupancy time duration of a data packet corresponds to the frame length of the corresponding data packet.

The individual circulation durations of the n data packets of the transmission order may thus vary depending on the corresponding addressed passive subscriber 103. With reference to the automation network 100 in FIG. 1, the individual circulation durations of data packets sent to passive subscribers 103 in different sub-segments XN of the same segment X vary.

Data packets addressed to passive subscribers 103 of different subsegments XN pass through different routes of the same segment X and pass through a different number of passive subscribers 103, so that the corresponding data packets thus have a different individual circulation time within the segment, i.e. require different durations to pass through the corresponding subsegments XN of the respective segment X before they may be returned to the active subscriber 101 by the corresponding connecting unit 105.

Consequently, data packets addressed to passive subscribers 103 in different segments X may also vary in their individual circulation durations, as such data packets pass through a different number of segments X and different routes within the segments X before they may be returned to the active subscriber 101 by the corresponding connecting units 105.

After determining the individual circulation time duration of each data packet, depending on the passive subscribers 103 addressed accordingly for the respective data packet, the active subscriber 101 arranges the data packets of the transmission order with descending individual circulation time duration in the descending transmission order.

In a first determining step 209, the active subscriber 101 determines a first receipt time marker for each of the n data packets of the descending transmission order. The first receipt time marker of any data packet of the descending transmission order in this context describes a period of time from the transmission by the active subscriber 101 of the first bit of the first data packet of the descending transmission order to the receipt by the active subscriber 101 of the first bit of the respective data packet of the descending transmission order.

In the first determining step 209, the active subscriber 101 further determines a second receipt time marker for each of the n data packets of the descending transmission order. The second receipt time marker of each data packet of the descending transmission order describes a sum of the first receipt time marker and an individual occupancy time duration of the respective data packet. As explained above, the individual occupancy time duration of a data packet describes a period from the transmission of a first bit of the data packet to a first transmission time marker to the transmission of a last bit of the data packet to a second transmission time marker by the active subscriber 101. For a data communication between the active subscriber 101 and the passive subscribers 103 in a cut-through procedure, the individual occupancy time duration of a data packet corresponds to the frame length of the respective data packet.

In a third arranging step 211, the active subscriber 101 arranges the n data packets of the descending transmission order into an ascending transmission order, wherein the first data packet of the ascending transmission order has the smallest first receipt time marker and the last data packet of the ascending transmission order has the largest first receipt time marker.

In a correcting step 213, the active subscriber 101 determines a corrected first receipt time marker for each data packet of the ascending transmission order if the first receipt time marker of the respective data packet is earlier than the second receipt time marker of a data packet arranged before the data packet in the ascending transmission order. A corrected first receipt time marker of a data packet of the ascending transmission order here corresponds to a second receipt time marker of a data packet arranged before the data packet in the ascending transmission order. In addition to the corrected first receipt time marker, the active subscriber 101 determines a corrected second receipt time marker for the respective data packets. The corrected second receipt time marker corresponds here to a sum of the corrected first receipt time marker and the individual occupancy time duration of the respective data packet.

Figure 4:
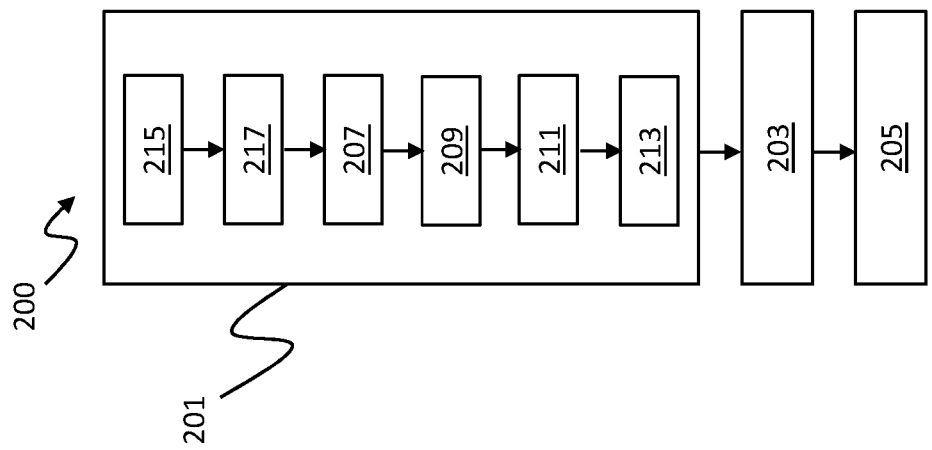
FIG. 4 is a flowchart of the method for data communication between subscribers in an automation network according to a further example.

For a more detailed description of the respective variables and the process steps described, please refer to the figure description for FIG. 4 and in particular to Tables 1 to 3 listed there and the explanations given for the corresponding tables.

FIG. 4 shows a flowchart of the method 200 for data communication between subscribers in an automation network 100 according to a further example.

Unless otherwise indicated, the method 200 according to the example in FIG. 4 comprises the method steps described for FIG. 2 or FIG. 3.

In a second determining step 215, the active subscriber 101 determines a transmission offset for each data packet. The transmission offset of a data packet in a transmission order corresponds to a sum of the individual occupancy durations of the data packets preceding the respective data packet in the respective transmission order.

In a fourth arranging step 217, the active subscriber 101 further arranges the n data packets in the descending transmission order such that a transmission of a first bit of a data packet of the descending transmission order is delayed by the transmission offset of the respective data packet with respect to the transmission of a first bit of the first data packet of the descending transmission order. The transmission offset of a data packet thereby corresponds to a sum of the individual occupancy durations of the data packets preceding the respective data packet. Each of the n data packets of the descending transmission order is thus delayed with respect to the data packet arranged directly in front of the data packet by the respective individual occupancy time duration of the data packet arranged directly preceding the corresponding data packet, so that transmission of a first bit of a data packet of the descending transmission order does not take place until the last bit of the data packet arranged directly ahead of the corresponding data packet has been transmitted.

In the following tables 1 to 3, the process steps described above as well as the variables occurring in them are shown by way of example on the basis of the automation network 100 shown in FIG. 1 using exemplary numerical values. The numerical values or time units given in Tables 1 to 3 as well as in Tables 4 to 5 explained for FIG. 5 do not exclusively correspond to real values and are used for illustrative purposes.

TABLE 1

Transmission order with individual rotation durations

|  | Latency | Individual occupancy time duration | Individual partial circulation duration (segment) | Individual circulation time |
| --- | --- | --- | --- | --- |
| DA1 | 4 | 16 | 280 | 304 |
| DA2 | 4 | 20 | 320 | 348 |
| DA3 | 4 | 24 | 400 | 432 |
| DB1 | 10 | 12 | 160 | 192 |
| DB2 | 10 | 24 | 380 | 424 |
| DC1 | 16 | 12 | 180 | 224 |
| DC2 | 16 | 16 | 280 | 328 |

Table 1 shows seven data packets to be transmitted by the active subscriber 101 to the passive subscribers 103 of the automation network 100 in an arbitrary transmission order. The individual data packets are identified by the designations DA1, DA2, DA3, DB1, DB2, DC1 and DC2 arranged to the left of Table 1. The identifiers of the individual data packets correspond to the subsegments DA1 to DC2 of the automation network 100 shown in FIG. 1. The data packet DA1 is thus addressed to the passive subscribers 103 of the first subsegment DA1, while the data packet DC2 is addressed to the passive subscribers 103 of the seventh subsegment DC2 of the automation network 100 in FIG. 1.

In the first column of Table 1, a latency (Lat) is given for each data packet. The latency relates to a period of time required for a data packet to be transmitted from the active subscriber 101 to the segment X comprising the respective subsegment XN. Consequently, the latencies of the different data packets differ according to the distance of the respective segments X to the active subscriber 101, so that the data packets DA1, DA2, DA3 have the lowest latency, while the data packets DC1 and DC2, which are each transmitted to the third segment C, have the highest latency.

In the second column of Table 1, an individual occupancy time duration is specified for each data package. The individual occupancy time durations are individually related to the respective data packet and may vary from data packet to data packet. The individual occupancy time duration may be interpreted with the frame length of a data packet. There is no correlation of the individual occupancy time duration of a data packet with the respective subsegment XN in which the addressed passive subscribers 103 are located.

Column 3 of table 1 shows an individual partial circulation time for each data packet. The individual part circulation time of a data packet relates to the time required by the data packet to pass through the respective segment X, in particular the respective subsegment XN, and thus in particular comprises the time from receiving the data packet via the corresponding connecting unit 105 of the respective segment X to sending the data packet to the active subscriber 101 via the respective connecting unit 105.

In the fourth column of Table 1, an individual circulation time duration is indicated for each data packet. The individual circulation time of a data packet refers to a period of time from transmitting a first bit of a data packet with the aid of the active subscriber 101 to receiving the last bit of the data packet with the aid of the active subscriber 101. The individual circulation time of a data packet thus describes the period of time required for one circulation of the respective data packet from the active subscriber 101 to the addressed passive subscribers 103 in a data communication forward direction and from the respective passive subscribers 103 back to the active subscriber 101 in a corresponding data communication return direction. From the quantities listed in Table 1, the individual circulation time duration for any data packet is the sum of twice the latency (once each for the data communication forward direction and once each for the data communication return direction) and the individual partial circulation time duration, each of which describes the time required for one complete circulation within the corresponding segment, minus the individual occupancy time duration of the respective data packet.

TABLE 2

Descending transmission order with descending individual circulation time duration and first receipt time marker

|  | Latency | Individual occupance time duration | Individual partial circulation duration (segment) | Individual circulation duration | Transmission offset | First receipt time marker |
| --- | --- | --- | --- | --- | --- | --- |
| DA3 | 4 | 24 | 400 | 432 | 0 | 408 |
| DB2 | 10 | 24 | 380 | 424 | 24 | 424 |
| DA2 | 4 | 20 | 320 | 348 | 48 | 376 |

TABLE 2-continued

Descending transmission order with descending individual
circulation time duration and first receipt time marker

|  | Latency | Individual occupance time duration | Individual partial circulation duration (segment) | Individual circulation duration | Transmission offset | First receipt time marker |
|---|---|---|---|---|---|---|
| DC2 | 16 | 16 | 280 | 328 | 68 | 380 |
| DA1 | 4 | 16 | 280 | 304 | 84 | 372 |
| DC1 | 16 | 12 | 180 | 224 | 100 | 312 |
| DB1 | 10 | 12 | 160 | 192 | 112 | 292 |

In Table 2, the data packets from Table 1 are arranged in a descending transmission order, with the respective data packets in the descending transmission order having descending individual circulation times. The first data packet of the descending transmission order, in Table 2 the data packet DA3, consequently has the longest individual circulation time, while the last data packet of the descending transmission order, in Table 2 the data packet DB1, has the shortest individual circulation time.

In addition to the values of Table 1, Table 2 shows a transmission offset for each data packet in the fifth column. The transmission offset for any data packet corresponds to a sum of the individual occupancy durations of the data packets preceding the corresponding data packet in the respective descending transmission order. The transmission offset of a data packet in the descending transmission order thus describes the delay in transmission of the first bit of the respective data packet compared to the transmission of the first bit of the first data packet. For example, the transmission of the first bit of the data packet DA1 is delayed by 84 time units compared to the transmission of the first bit of the data packet DA3.

In the sixth column of Table 2, a first receipt time marker is further indicated for each data packet. The first receipt time marker is a point in time of receiving the first bit of the respective data packet by the active subscriber 101, and a value of the first receipt time marker describes a period from transmission of the first bit of the first data packet of the descending transmission order by the active subscriber 101 to receipt of the first bit of the respective data packet by the active subscriber 101. Using the quantities listed in Table 2, the first receipt time marker for a data packet is a sum of the individual circulation time duration and of the transmission offset of the respective data packet minus the individual occupancy time duration of the respective data packet.

A value of a first receipt time marker of a data packet of the descending transmission order relates to a period from transmission of a first bit of the first data packet of the descending transmission order by the active subscriber 101 to receipt of a first bit of the respective data packet by the active subscriber 101. Using the quantities shown in Table 2, a first receipt time marker of a data packet is a sum of an individual circulation time duration of the data packet and a transmission offset of the data packet minus an individual occupancy time duration of the respective data packet.

TABLE 3

Ascending transmission order with ascending first
receipt time marker and corrected first receipt time marker

|  | Latency | Individual occupance time | Individual part circulation duration (segment) | Individual circulation duration | Transmission offset | First receipt time marker | Corrected first receipt time marker |
|---|---|---|---|---|---|---|---|
| DB1 | 10 | 12 | 160 | 192 | 112 | 292 | 292 |
| DC1 | 16 | 12 | 180 | 224 | 100 | 312 | 312 |
| DA1 | 4 | 16 | 280 | 304 | 84 | 372 | 372 |
| DA2 | 4 | 20 | 320 | 348 | 48 | 376 | 388 |
| DC2 | 16 | 16 | 280 | 328 | 68 | 380 | 408 |
| DA3 | 4 | 24 | 400 | 432 | 0 | 408 | 424 |
| DB2 | 10 | 24 | 380 | 424 | 24 | 424 | 448 |

In Table 3, the data packets of the descending transmission order of Table 2 are arranged in an ascending transmission order. In the ascending transmission order of Table 3, the data packets are arranged with ascending first receipt time markers, so that the first data packet of the ascending transmission order, in Table 3 the data packet DB1, has the smallest first receipt time marker, and the last data packet of the ascending transmission order, in Table 3 the data packet DB2, consequently has the largest first receipt time marker.

The seventh column of table 3 further indicates a corrected first receipt time marker for each data packet. According to the correcting step 213, a data packet must be delayed, in particular on the data communication return direction, if a collision of the data packet with a preceding data packet is to be feared. Such a collision corresponds to the situation in which a first receipt time marker of a data packet is earlier than a second receipt time marker of a data packet preceding the data packet. A second receipt time marker of the data packet corresponds to a sum of the first receipt time marker of the respective data packet and the individual occupancy time duration of the data packet.

In Table 3, the first three data packets DB1, DC1 and DA1 are not affected by a collision with the respective preceding data packets. The first receipt time marker of data packet DC1 is later than the first receipt time marker of data packet DB1 plus the individual occupancy time duration of data packet DB1. The first receipt time marker of data packet DA1, as well, is later than the first receipt time marker of data packet DC1 plus the individual occupancy time duration of data packet DC1. Consequently, for the first three data packets DB1, DC1 and DA1, there is no reason to cause a delay and determine a corrected first receipt time marker that differs from the first receipt time marker.

The first receipt time marker of the fourth data packet DA2, on the other hand, is earlier than a sum of the first receipt time marker of the data packet DA1 and the individual occupancy time duration of the data packet DA1. A collision would thus be feared between the data packets DA1 and DA2, and therefore reasons exist to delay the fourth data packet DA2. The active subscriber 101 thus determines a corrected first receipt time marker for the data packet DA2 in the correcting step 213. The corrected first receipt time marker for the data packet DA2 corresponds to a sum of the first receipt time marker of the data packet DA1 and the individual occupancy time duration of the data packet DA1, i.e. the second receipt time marker of the data packet DA1.

The delay of the data packet DA2 and the determination of the corrected first receipt time marker of the data packet DA2 leads to a collision of the data packets DA2 and DC2 in that the first receipt time marker of the fifth data packet DC2 is earlier than a sum of the corrected first receipt time marker of the data packet DA2 and the individual occupancy time duration of the data packet DA2, i.e. the corrected second receipt time marker of the data packet DA2. The fifth data packet DC2 must therefore also be delayed and a corrected first receipt time marker for the data packet DC2 must be determined. The corrected first receipt time marker for the data packet DC2 corresponds to a sum of the corrected first receipt time marker of the data packet DA2 and the individual occupancy time duration of the data packet DA2, i.e. the corrected second receipt time marker of the data packet DA2.

As may be seen from Table 3, the sixth and seventh data packets DA3, DB2 must also be delayed because a collision between the data packet DC2 and the data packet DA3 and a collision between the data packet DA3 and the data packet DB2 may be expected. The corresponding corrected first receipt time markers of the data packet DA3 and the data packet DB2 are determined analogously to the steps described above, so that a corrected first receipt time marker of the data packet DA3 corresponds to a sum of the corrected first receipt time marker of the data packet DC2 and the individual occupancy time duration of the data packet DC2, i.e. a corrected second receipt time marker of the data packet DC2, and a corrected first receipt time marker of the data packet DB2 corresponds to a sum of a corrected first receipt time marker of the data packet DA3 and an individual occupancy time duration of the data packet DA3, i.e. a corrected second receipt time marker of the data packet DA3.

The delays of the fourth to seventh data packets of the ascending transmission order lead to an extension of the total occupancy time duration of the ascending transmission order. The total occupancy time duration of the ascending transmission order corresponds to a sum of the corrected first receipt time marker of the last data packet DB2 and the individual occupancy time duration of the last data packet DB2.

Figure 5:
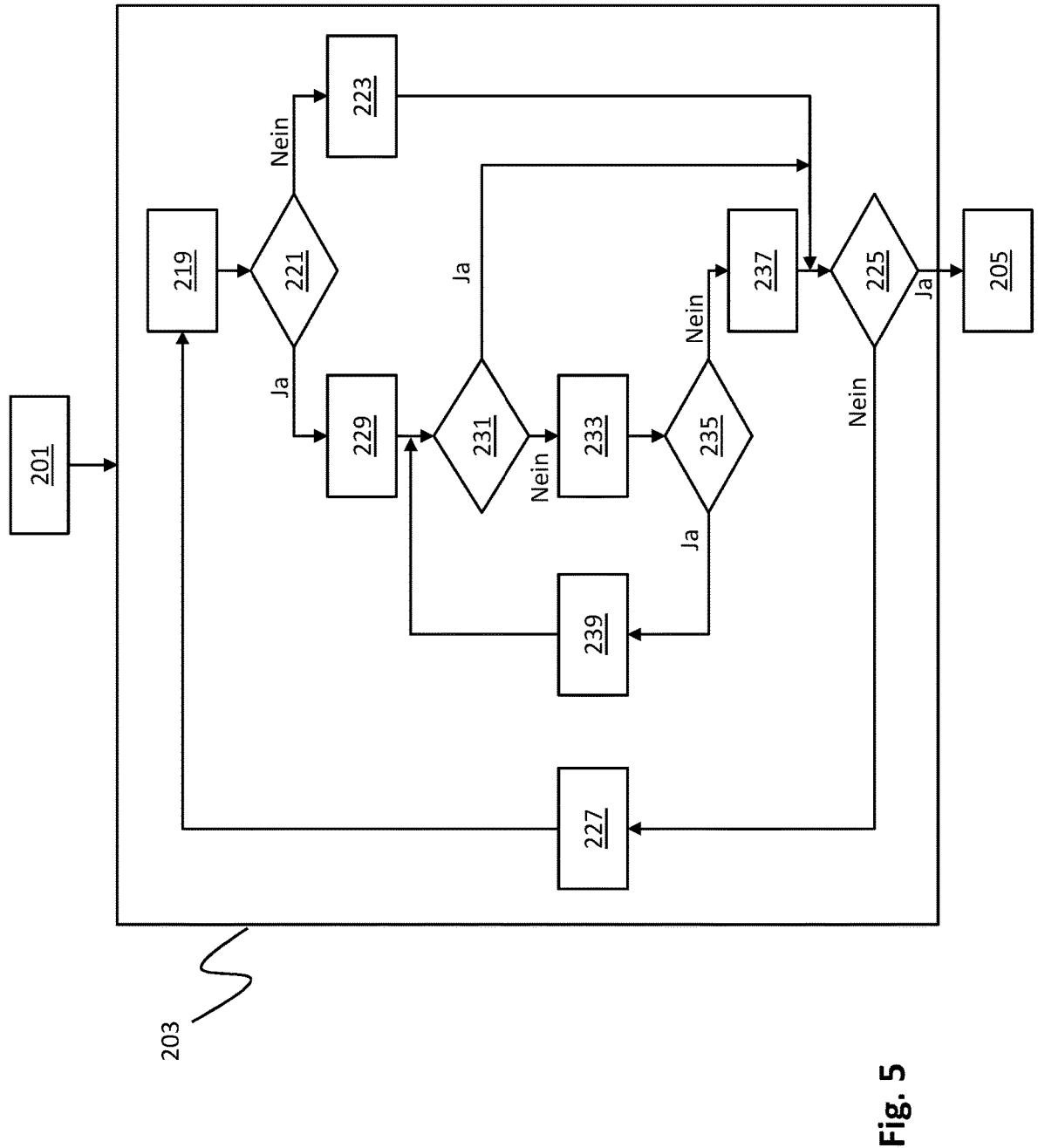
FIG. 5 is a flowchart of the method for data communication between subscribers in an automation network according to a further example.

FIG. 5 shows a flowchart of the method 200 for data communication between subscribers in an automation network 100 according to another example.

Unless otherwise indicated, the method 200 according to the example in FIG. 5 comprises the method steps described for FIG. 2, FIG. 3 or FIG. 4.

According to the example in FIG. 5, the optimizing step 203 comprises the process steps:
  permutating the order of an i-th data packet and an (i+1)-th data packet following the i-th data packet in an m-th transmission order of the n data packets with an m-th total occupancy time duration of the m-th transmission order,
  forming an (m+1)-th transmission order with an (m+1)-th total occupancy time duration, wherein in the (m+1)-th transmission order the order of the i-th data packet and the (i+1)-th data packet is permutated, and wherein $1 \leq i \leq n-1$ and $n \geq 3$ with i, k, m, n being elements of the natural numbers, in a first permutating step 219, and
  verifying that the (m+1)-th total occupancy time duration is shorter than the m-th total occupancy time duration in a first verifying step 221.

If the (m+1)-th total occupancy period is not shorter than the m-th total occupancy period:
  re-permutating the order of the i-th data packet and the (i+1)-th data packet and restoring the m-th transmission order in a first re-permutating step 223;
  verifying that $i=n-1$ applies in a second verifying step 225;
  if $i=n-1$ applies, transmitting the n data packets on the basis of the m-th transmission order in the transmitting step 205;
  if $i=n-1$ does not apply, setting $i=i+1$ in a first setting step 227; and
  continuing with the first permutating step 219 with the m-th transmission order.

If the (m+1)-th total occupancy time duration is shorter than the m-th total occupancy time duration,
  maintaining the permutation of the order of the i-th data packet and the (i+1)-th data packet in the (m+1)-th transmission order and setting $k=i$ in the (m+1)-th transmission order in a second setting step 229, and
  verifying whether $k<2$ in the (m+1)-th transmission order, in a third verifying step 231;
  if $k<2$ applies, continuing with the second verifying step 225 with the (m+1)-th transmission order,
  if $k<2$ (does not apply):
    permutating the order of the k-th data packet and the (k−1)-th data packet preceding the k-th data packet in the (m+1)-th transmission order and determining an (m+2)-th transmission order with an (m+2)-th total occupancy time duration, wherein in the (m+2)-th transmission order the order of the k-th data packet and the (k−1)-th data packet is permutated, in a second permutating step 233, and
    verifying whether the m+2nd total occupancy time duration is shorter than the (m+1)-th total occupancy time duration of the (m+1)-th transmission order in a fourth verifying step 235.

If the (m+2)-th total occupancy period is not shorter than the (m+1)-th total occupancy period:
  re-permutating the order of the k-th data packet and the (k−1)-th data packet and restoring the (m+1)-th transmission order in a second re-permutating step 237, and
  continuing with the second verifying step 225 with the (m+2)-th transmission order,
  if the (m+2)-th total occupancy time duration is shorter than the (m+1)-th total occupancy time duration:
    maintaining the permutation of the order of the k-th data packet and the (k−1)-th data packet in the (m+1)-th transmission order and setting $k=k-1$ and $m=m+2$ in a third setting step 239, and continuing with the third verifying step 231 with the m-th transmission order.

In order to optimize a transmission order, e.g. the ascending transmission order of Table 3, the active subscriber 101 performs an optimizing procedure in the optimizing step 203 to determine, e.g. on the basis of the ascending transmission order, an optimized transmission order that has a lower total occupancy time duration than the ascending transmission order.

For this purpose, in a first permutating step 219, the active subscriber 101 permutates the order of an i-th data packet and an (i+1)-th data packet following the i-th data packet in an m−1-th transmission order. For a transmission order with n data packets, the i-th data packet may be any data packet with $i \geq 1$ and $i \leq n-1$, wherein $n \geq 3$. The m-th transmission order may be any initial transmission order. For example, the m-th transmission order may be the ascending transmission order in which the n data packets are arranged with ascending first receipt time marker. According to an example, the i-th data packet may be a first data packet of a transmission order, in particular the first data packet of the ascending transmission order.

By permutating the order of the i-th data packet and the (i+1)-th data packet in the m-th transmission order, an (m+1)-th transmission order is formed in which the order of the i-th data packet and the (i+1)-th data packet is permutated with respect to the m-th transmission order. The m-th transmission order has an m-th total occupancy time duration and the (m+1)-th transmission order has an (m+1)-th total occupancy time duration. The m-th total occupancy time duration of the m-th transmission order and the (m+1)-th total occupancy time duration of the (m+1)-th transmission order may be different from each other. For a detailed description of the calculation of the total occupancy time durations and the changes of the total occupancy time durations by permutating the order of data packets, please refer to the description of Tables 4 and 5.

In a first verifying step 221, the active subscriber 101 verifies whether an (m+1)-th total occupancy time duration of the (m+1)-th transmission order is shorter than the m-th total occupancy time duration of the m-th transmission order.

If the (m+1)-th total occupancy time duration is not shorter than the m-th total occupancy time duration, the active subscriber 101 re-permutates the orders of the i-th data packet and the (i+1)-th data packet and restores the m-th transmission order in a first re-permutating step 223.

In a second verifying step 225, the active subscriber 101 checks whether the previously permutated i-th data packet in the restored m-th transmission order is the respective penultimate data packet of the m-th transmission order, i.e. whether $i = n-1$ applies.

If the i-th data packet is the penultimate data packet of the m-th transmission order and consequently $i = n-1$ applies, the optimizing procedure is finished and the active subscriber 101 transmits the n data packets based on the m-th transmission order, i.e.: the initial transmission order, e.g. the ascending transmission order, to the passive subscribers 103 in the transmitting step 205.

If the i-th data packet is not the penultimate data packet of the m-th sequence and consequently $i = n-1$ does not apply, the active subscriber 101 sets $i = i+1$ in a first setting step 227 in the m-th transmission order. Setting $i = i+1$ advances one position further towards the end of the transmission order for the next pairwise permutation in the transmission order, so that in subsequent permutating steps the data packets following the i-th data packet of the first permutating step 219 are permutated with each other. For example, if $i = 1$ applied in the first permutating step 219 and consequently the order of the first and second data packet were permutated with each other in the first permutating step 219, setting $i = i+1$, i.e.: $i = 2$, means that in a following permutating step the order of the second and third data packet are permutated with each other.

The method 200 continues by repeating the first permutating step 219 with respect to the newly set i-th data packet and the newly set (i+1)-th data packet. By further setting $i = i+1$ and correspondingly permutating i-th data packets and (i+1)-th data packets, the pairwise permutations of data packets in each repeated execution of the first permutating step 219 and a preceding first setting step 227 are each advanced by one position toward the end of the m-th transmission order, e.g. an initial transmission order, e.g. the ascending transmission order. Thus, in n−1 steps, all n data packets of the transmission order may be permutated once with the directly following data packet and once with the directly preceding data packet.

If it is determined in the first verifying step 221 that the (m+1)-th total occupancy time duration is shorter than the m-th total occupancy time duration, the permutation of the order of the i-th data packet and the (i+1)-th data packet in the (m+1)-th transmission order is maintained, and in a second setting step 229 in the (m+1)-th order, $k = i$ is set.

By renaming the i-th data packet to the k-th data packet, it is indicated that in the following process step the permutation of the data packets is continued in the opposite direction. When using the index i for the i-th data packet and the (i+1)-th data packet, it is indicated that the permutating direction points from the beginning of the transmission order towards the end of the transmission order. Thus, successive data packets are permutated until the end of the transmission order is reached.

When using the index k for the k-th data packet and the (k−1)-th data packet, it is indicated that the permutating continues starting from the k=ith data packet in the direction of the beginning of the transmission order.

In a third verifying step 231, the active subscriber 101 checks whether the k-th data packet is the first data packet of the (m+1)-th transmission order, i.e. whether $k < 2$ applies.

If the k-th data packet is the first data packet of the (m+1)-th transmission order, the second verifying step 225 proceeds with respect to the (m+1)-th transmission order.

If it is determined in the third verifying step 231 that the k-th data packet is not the first data packet of the (m+1)-th transmission order and consequently $k < 2$ does not apply, then in a second permutating step 233 the order of the k-th data packet and the (k−1)-th data packet preceding the k-th data packet in the (m+1)-th transmission order is permutated and an (m+2)-th transmission order with an (m+2)-th total occupancy time duration is determined. In the m+2nd transmission order, the order of the k-th data packet and the (k−1)-th data packet is swapped in comparison to the (m+1)-th transmission order.

In a fourth verifying step 235, it is verified whether the (m+2)-th total occupancy time duration of the (m+2)-th transmission order is shorter than the (m+1)-th total occupancy time duration of the (m+1)-th transmission order.

If it is determined in the fourth verifying step 235 that the (m+2)-th total occupancy time duration is not shorter than the (m+1)-th total occupancy time duration, the order of the k-th data packet and the (k−1)-th data packet is changed back and the (m+1)-th transmission order is restored in a second re-permutating step 237.

With the (m+1)-th transmission order, the procedure continues with the second verifying step 225.

If it is determined in the fourth verifying step 235 that the (m+2)-th total occupancy time duration is shorter than the (m+1)-th total occupancy time duration, the permutation of the order of the k-th data packet and the (k−1)-th data packet in the (m+2)-th transmission order is maintained and k=k−1 and m=m+2 are set in the (m+2)-th transmission order in a third setting step 239. By setting k=k−1, it is achieved that in a following second permutating step 233 the order of the two data packets arranged in the m-th transmission order before the k-th data packet are permutated with each other, if in the following third verifying step 231 it is determined that it does not hold k<2.

The method continues with the third verifying step 231 with the m-th transmission order and the newly set k-th and (k−1)-th data packets. If, for example, k=5 applied in the second permutating step 233, i.e. if the fifth data packet and the fourth data packet of the corresponding transmission order were permutated in the second permutating step 233, then k=4 applied by setting k=k−1 in the m-th transmission order. Consequently, the fourth data packet is permutated with the third data packet of the m-th transmission order in the second permutating step 233, thus creating an (m+2)-th transmission order. By setting k=k−1 and the following permutations, it is thus achieved that, starting from the k-th data packet, pairwise permutations are effected in the direction of the start of the respective transmission order.

The described optimizing procedure thus preferably performs pairwise permutations of directly successive data packets starting from the beginning of a transmission order in the direction of the end of the transmission order until a permutation of two successive data packets results in a shorter total occupancy time.

If the total occupancy time is shorter, the permutating of the two data packets is maintained and, starting from the permutated data packets, permutations are again performed in pairs in the direction of the start of the respective transmission order. If these permutations do not lead to a shortened transmission order, permutations are again continued in pairs starting from the permutated data packets, the permutations of which have led to a shortened transmission order in the direction of the end of the transmission order.

For each swap of data packets in the direction of the end of the transmission order, in which a reduced total occupancy time is achieved, permutations are performed starting from these two permutated data packets in the direction of the beginning of the transmission order until no improvement in the total occupancy time is achieved or the beginning of the transmission order is reached. The process then continues with pairwise permutations in the direction of the end of the transmission order. The optimizing procedure is finished as soon as the end of the transmission order is reached. The transmission order with the shortest total occupancy time is in each case used to transmit the n data packets with the aid of the active subscriber 101 after completion of the optimization process.

Tables 4 and 5, which are a continuation of Tables 1 to 3, are used to illustrate a permutation of data packets according to the optimizing procedure described above and a determination of the total occupancy time duration of the transmission order achieved by the permutations.

TABLE 4

Ascending transmission order with ascending first receipt time marker, corrected first receipt time marker and pairwise permutation

|   | Latency | Individual occupance time duration | Individual part circulation duration (segment) | Individual circulation duration | Transmission offset | First receipt duration | Corrected first receipt time duration |
|---|---|---|---|---|---|---|---|
| DB1 | 10 | 12 | 160 | 192 | 112 | 292 | 292 |
| DC1 | 16 | 12 | 180 | 224 | 100 | 312 | 312 |
| DA1 | 4 | 16 | 280 | 304 | 84 | 372 | 372 |
| DC2 | 16 | 16 | 280 | 328 | 48 | 360 | 360 |
| DA2 | 4 | 20 | 320 | 348 | 64 | 392 | 392 |
| DA3 | 4 | 24 | 400 | 432 | 0 | 408 | 424 |
| DB2 | 10 | 24 | 380 | 424 | 24 | 424 | 448 |

Table 4 is based on Table 3 and shows the ascending transmission order of the seven data packets DA1 to DC2. Compared to Table 3, the order of the fourth data packet DA2 and of the fifth data packet DC2 is swapped in Table 4. By permutating the data packet DC2 to the position of the data packet DA2, the data packet DC2 takes over the transmission offset of the data packet DA2. After permutation, the data packet DC2 thus has a transmission offset of 48 time units. According to the calculation method for the first receipt time marker listed in Table 2, which corresponds to a sum of the individual circulation time and the transmission offset minus the individual occupancy time of a data packet, the permutation reduces the first receipt time marker of data packet DC2 from 380 time units in Table 3 to 360 time units in Table 4.

By permutating the order of the data packet DC2 with the data packet DA2, a new transmission offset is also assigned to the data packet DA2. However, the transmission offset of data packet DA2 after the swap with data packet DC2 is not the same as the transmission offset of data packet DC2 prior to permutation. Since the transmission offset of a data packet corresponds to the sum of the individual occupancy durations of the data packets preceding the respective data packet, and due to the permutation of data packet DA2 with data packet DC2, which is located ahead of data packet DA2 after the permutation, but which has an individual occupancy duration four time units shorter than data packet DA2, the transmission offset of data packet DC2 after the permutation is also reduced by four time units compared to the transmission offset of data packet DC2 before the permutation. According to the above calculation method, the first receipt time marker for data packet DA2 after permutating is different from the one shown in Table 3.

TABLE 5

Ascending transmission order with ascending first receipt time marker, corrected first receipt time marker and pairwise permutation

|  | Latency | Individual occupancy time | Individual part circulation duration (segment) | Individual circulation duration | Transmission offset | First receipt time duration | Corrected first receipt time duration |
|---|---|---|---|---|---|---|---|
| DB1 | 10 | 12 | 160 | 192 | 112 | 292 | 292 |
| DC1 | 16 | 12 | 180 | 224 | 100 | 312 | 312 |
| DC2 | 16 | 16 | 280 | 328 | 48 | 360 | 360 |
| DA1 | 4 | 16 | 280 | 304 | 84 | 372 | 376 |
| DA2 | 4 | 20 | 320 | 348 | 64 | 392 | 392 |
| DA3 | 4 | 24 | 400 | 432 | 0 | 408 | 412 |
| DB2 | 10 | 24 | 380 | 424 | 24 | 424 | 436 |

Table 5 is based on Table 4 and emerges from it by permutating the DA1 and DC2 data packets.

The new first receipt time marker of data packet DC2 resulting from the permutation of data packet DC2 with data packet DA2 is shorter than the first receipt time marker of data packet DA1 arranged ahead of data packet DC2 in Table 4. In order to maintain the ascending transmission order within Table 4 in which the data packets are arranged starting from data packet DB1 with ascending first receipt time marker, the order of data packets DC2 and DA1 is permutated in Table 5 compared to Table 4.

Since, after the data packets DC2 and DA1 have been permutated, the first receipt time marker of the data packet DA1 is earlier than the second receipt time marker of the data packet DC2, which corresponds to a sum of the first receipt time marker of the data packet DC2 and the individual occupancy time duration of the data packet DC2, the data packet DA1 must be subjected to a delay in order to avoid a collision of the data packets DA1 and DC2. Thus, a corrected first receipt time marker has been determined for the data packet DA1 in Table 5, which corresponds to a sum of the first receipt time marker of the data packet DC2 and the individual occupancy time duration of the data packet DC2. Since a collision between the data packet DA1 and the data packet DA2 is not to be feared, the corrected first receipt time marker of the data packet DA2 corresponds to the first receipt time marker of the data packet DA2. Due to corresponding collisions between the data packet DA2 and the data packet DA3 or the data packet DA3 and the data packet DB2, corrected first receipt time markers are determined for the data packet DA3 and the data packet DB2 according to the method described above.

For the ascending transmission order shown in Table 5 with the above-described permutations of the sequences of the data packets DA1, DC2 and DA2, a total occupancy time duration results from the corrected first receipt time marker of the last received data packet DB2 and the corresponding individual occupancy time duration of the data packet DB2. The total occupancy time duration of the transmission order listed in Table 5 corresponds to 460 time units. In comparison, the transmission order of Table 3 has a total occupancy time duration, which also results from the corrected first receipt time marker of the last received data packet DB2 and the individual occupancy time duration of the data packet DB2, of 472 time units. This illustrates that by permutating the above data packets in Tables 4 and 5, a reduction in the total occupancy time duration of the respective transmission order of the seven data packets may be achieved.

The procedure described above may be continued with the data packets in Table 5 until an optimized transmission order with minimum total occupancy time is achieved. The illustration of the individual process steps using Tables 1 to 5 is for illustrative purposes only. Since the permutations of the data packets in Tables 4 and 5 have made it possible to clarify the characteristics of the individual permutating steps and the determination of an overall occupancy time duration of a transmission order, no further example-based illustration of additional permutating steps is provided.

This invention has been described with respect to exemplary examples. It is understood that changes can be made and equivalents can be substituted to adapt these disclosures to different materials and situations, while remaining with the scope of the invention. The invention is thus not limited to the particular examples that are disclosed, but encompasses all the examples that fall within the scope of the claims.

TABLE 6

List of Reference Symbols

100 Automation network
101 Active subscriber
103 Passive subscriber
105 Connecting unit
107 First connecting unit
109 Second connecting unit
111 Third connecting unit
113 Controller
115 Data line network
117 Data communication forward direction
119 Data communication return direction
X Segment
XN Subsegment
A First segment
A1 First subsegment
A2 Second subsegment
A3 Thrid subsegment
B Second segment
B2 Fifth subsegment
C Third segment
C1 Sixth subsegment
C2 Seventh subsegment
200 Data communication method
201 First arranging step
203 Optimizing step
205 Transmitting step
207 Second arranging step
209 First determining step
211 Third arranging step
213 Correcting step
215 Second determining step
217 Fourth arranging step
219 First permutating step
221 First verifying step
223 First re-permutating step TABLE 6-continued List of Reference Symbols 225 Second verifying step
227 First setting step
229 Second setting step
231 Third verifying step
233 Second permutating step
235 Fourth verifying step
237 Second re-permutating step
239 Third setting step

The invention claimed is:

1. A method for real-time capable data communication between subscribers in an automation network, wherein the automation network comprises:
an active subscriber, a plurality of passive subscribers and at least one connecting unit, which are connected to one another via a data line network,
the data line network being configured as a field-bus system,
the active subscriber being configured to send out data packets to the passive subscribers for the purpose of data communication in circulation in which the data packets are transmitted from the active subscriber to the passive subscribers and data packets are transmitted from the passive subscribers to the active subscriber, and
the connecting unit being configured to forward data packets addressed to the passive subscribers and to return the data packets to the active subscriber;
the method comprising the method steps:
the active subscriber arranging n data packets to be transmitted in a transmission order with a total occupancy time duration of the transmission order in a first arranging step, wherein the total occupancy time duration comprises a period from transmission by the active subscriber of a first bit of a first transmitted data packet to receipt by the active subscriber of a last bit of a last received data packet,
the active subscriber performing an optimizing procedure for determining an optimized transmission order with minimum total occupancy time duration in an optimizing step, the optimizing procedure comprising a finite number of at most $n*(n-1)/2$ pairwise permutations of orders of n data packets consecutive in the transmission order and determining of the total occupancy time durations of the transmission orders generated by the permutations, and
the active subscriber transmitting the n data packets in the optimized transmission order to the passive subscribers in a transmitting step.

2. The method according to claim 1, wherein the first arranging step comprises:
arranging the n data packets in a descending transmission order with descending individual circulation durations of the n data packets in a second arranging step,
wherein in the descending transmission order a data packet with longest individual circulation duration is arranged at the first position and a data packet with shortest individual circulation duration is arranged at the last position of the transmission order, and
wherein the individual circulation time duration of each data packet comprises a period from transmission by the active subscriber of a first bit of the data packet to receipt by the active subscriber of a last bit of the data packet.

3. The method of claim 2, wherein the first arranging step further comprises:
determining a first receipt time marker for each of the n data packets of the descending transmission order in a first determining step,
wherein the first receipt time marker of any data packet of a transmission order is a time of receipt of the first bit of the respective data packet, and
wherein a value of the first receipt time marker comprises a period from transmission by the active subscriber of the first bit of the first data packet of the transmission order to receipt by the active subscriber of the first bit of the respective data packet of the transmission order;
determining a second receipt time marker for each of the n data packets of the descending transmission order,
wherein the second receipt time marker corresponds to a sum of the value of the first receipt time marker and an individual occupancy time duration of the data packet,
the individual occupancy time duration of a data packet comprising a period of time from the transmission of a first bit of the data packet to a first transmission time marker to the transmission of a last bit of the data packet to a second transmission time marker,
wherein the first transmission time marker is a point in time of transmission of the first bit of the respective data packet, and
wherein the second transmission time marker is a point in time of transmission of the last bit of the data packet;
arranging the n data packets of the descending transmission order in an ascending transmission order with ascending first receipt time marker of the n data packets in a third arranging step,
wherein in the ascending transmission order a data packet with the smallest first receipt time marker is arranged at first position and a data packet with the largest first receipt time marker is arranged at last position; and
determining a corrected first receipt time marker and a corrected second receipt time marker for a data packet in the ascending transmission order in a correcting step if the first receipt time marker of the data packet is earlier than the second receipt time marker of a data packet preceding the data packet in the ascending transmission order,
wherein the corrected first receipt time marker of the data packet corresponds to the second receipt time marker of the data packet arranged before the data packet, and
wherein the corrected second receipt time marker of the data packet corresponds to a sum of the corrected first receipt time marker and the individual occupancy time duration of the data packet.

4. The method according to claim 3, wherein the first arranging step comprises:
determining a transmission offset for each data packet in a second determining step,
wherein the transmission offset of a data packet corresponds to a sum of the individual occupancy time durations of the data packets preceding the data packet in the transmission order; and
arranging the n data packets in the descending transmission order in a fourth arranging step such that a transmission of a first bit of a data packet is delayed by the transmission offset of the data packet with respect to the transmission of a first bit of the first data packet of the descending transmission order.

5. The method according to claim 1, wherein the optimizing step comprises:
   permutating the order of an i-th data packet and an (i+1)-th data packet following the i-th data packet in an m-th transmission order of the n data packets with an m-th total occupancy time duration of the m-th transmission order,
   forming an (m+1)-th transmission order with an (m+1)-th total occupancy time duration, wherein in the (m+1)-th transmission order, the order of the i-th data packet and the (i+1)-th data packet is permutated, and wherein $1 \leq i \leq n-1$ and $n \geq 3$, where i, m, n, k are natural numbers, in a first permutating step, and
   verifying whether the (m+1)-th total occupancy time duration is shorter than the m-th total occupancy time duration in a first verifying step;
   if the (m+1)-th total occupancy period is not shorter than the m-th total occupancy period:
      re-permutating the order of the i-th data packet and the (i+1)-th data packet and restoring the m-th transmission order in a first re-permutating step;
      verifying that $i=n-1$ in the m-th transmission order in a second verifying step;
      If $i=n-1$ applies, transmitting the n data packets based on the m-th transmission order in the transmitting step;
      if $i=n-1$ does not apply, setting $i=i+1$ in the m-th transmission order in a first setting step; and
      continuing with the first permutating step with the m-th transmission order;
   if the (m+1)-th total occupancy time duration is shorter than the m-th total occupancy time duration:
      maintaining the permutation of the order of the i-th data packet and the (i+1)-th data packet in the (m+1)-th transmission order and setting $k=i$ in the $m=(m+1)$-th transmission order in a second setting step, and
      verifying that $k<2$ in the (m+1)-th transmission order, in a third verifying step;
      if $k<2$ applies, continuing with the second verifying step with the (m+1)-th transmission order,
      If $k<2$ does not apply:
         permutating the order of the k-th data packet and the (k−1)-th data packet preceding the k-th data packet in the (m+1)-th transmission order and determining an (m+2)-th transmission order with an (m+2)-th total occupancy time duration, wherein in the (m+2)-th transmission order the order of the k-th data packet and the (k−1)-th data packet is permutated with respect to the (m+1)-th transmission order, in a second permutating step, and
         verifying whether the (m+2)-th total occupancy time duration is shorter than the (m+1)-th total occupancy time duration in a fourth verifying step,
      if the (m+2)-th total occupancy time duration is not shorter than the (m+1)-th total occupancy time duration:
         re-permutating the order of the k-th data packet and the (k−1)-th data packet and restoring the (m+1)-th transmission order in a second re-permutating step, and
         continuing with the second verifying step with the (m+1)-th transmission order,
      if the (m+2)-th total occupancy time duration is shorter than the (m+1)-th total occupancy time duration:
         maintaining the permutation of the order of the k-th data packet and the (k−1)-th data packet in the (m+2)-th transmission order and setting $k=k-1$ and $m=m+2$ in a third setting step, and
         continuing with the third verifying step with the m-th transmission order.

6. The method according to claim 5, wherein the first permutating step starts with the first data packet with $i=1$ of the first transmission order with $m=1$.

7. The method according to claim 5, wherein the first total occupancy time duration with $m=1$ is the corrected total occupancy time duration of the ascending transmission order.

8. An active subscriber for an automation network, wherein the active subscriber is configured to perform a method according to claim 1.

9. An automation network having at least an active subscriber according to claim 8, and further comprising:
   a plurality of passive subscribers and at least a connecting unit, which are connected via a data line network,
   the data line network being configured as a field-bus system,
   the active subscriber being configured to send out data packets to the passive subscribers for data communication in circulation, in which the data packets are transmitted from the active subscriber to the passive subscribers and are returned by the passive subscribers to the active subscriber, and
   wherein the connecting unit is configured to forward data packets addressed to the passive subscribers of a specific segment and to return the data packets to the active subscriber.

* * * * *